US008787831B2

(12) United States Patent
Huang et al.

(10) Patent No.: US 8,787,831 B2
(45) Date of Patent: Jul. 22, 2014

(54) SMART DATA STORAGE APPARATUS AND DATA TRANSMITTING METHOD FOR THE SAME

(75) Inventors: Wei-Chun Huang, Taipei (TW); Tsung-Hsing Hsieh, Taipei (TW)

(73) Assignee: Jogtek Corp., Taipei (TW)

( * ) Notice: Subject to any disclaimer, the term of this patent is extended or adjusted under 35 U.S.C. 154(b) by 291 days.

(21) Appl. No.: 13/488,719

(22) Filed: Jun. 5, 2012

(65) Prior Publication Data

US 2013/0324037 A1 Dec. 5, 2013

(51) Int. Cl.
*H04B 5/00* (2006.01)

(52) U.S. Cl.
USPC ............ 455/41.1; 455/130; 455/14; 455/131; 455/282; 455/333; 345/204; 345/100; 326/30; 326/82; 326/86; 326/115

(58) Field of Classification Search
USPC .................. 455/41.1, 130, 14, 131, 282, 333; 711/103; 345/204, 100; 326/30, 82, 86, 326/115
See application file for complete search history.

(56) References Cited

U.S. PATENT DOCUMENTS

| | | | | |
|---|---|---|---|---|
| 6,631,453 | B1 * | 10/2003 | Friday | 711/163 |
| 7,320,093 | B2 * | 1/2008 | Yagi | 714/50 |
| 2006/0107124 | A1 * | 5/2006 | Yagi | 714/50 |
| 2007/0083694 | A1 * | 4/2007 | Chen | 710/305 |
| 2012/0010887 | A1 * | 1/2012 | Boregowda et al. | 704/250 |
| 2013/0057896 | A1 * | 3/2013 | Ito | 358/1.14 |
| 2013/0217352 | A1 * | 8/2013 | Pan et al. | 455/404.1 |

* cited by examiner

*Primary Examiner* — Ganiyu A Hanidu
(74) *Attorney, Agent, or Firm* — Muncy, Geissler, Olds & Lowe, P.C.

(57) ABSTRACT

A smart data storage apparatus and data transmitting method for the same are to combine the hard disk with the dual interface memory, and are to use radio frequency identification (RFID) technology or near field communication (NFC) technology. The information of the self-monitoring analysis and reporting technology (SMART) of the hard disk still could be received by the handheld device without the power for the hard disk. Moreover, the external hard disk could be registered with the handheld device quickly.

10 Claims, 3 Drawing Sheets

SMART DATA STORAGE APPARATUS AND DATA TRANSMITTING METHOD FOR THE SAME

BACKGROUND OF THE INVENTION

1. Field of the Invention

The present invention relates to a data storage apparatus and data transmitting method for the same, and especially relates to a smart data storage apparatus and data transmitting method for the same.

2. Description of Prior Art

A data storage apparatus, for example a hard disk, is an apparatus for storing digital data. The hard disk is a very common technical product. Now every computer includes at least one hard disk.

The self-monitoring analysis and reporting technology (SMART) is very important for the hard disk. The self-monitoring analysis and reporting technology is like the black box for the hard disk. There is a lot of information about the hard disk in the self-monitoring analysis and reporting technology (for example, the damage condition of the hard disk).

The damage hard disk will be connected into a computer and will be powered on to read the self-monitoring analysis and reporting technology in the hard disk by the engineer when the hard disk needs to be repaired. However, it is very dangerous that the damage hard disk is powered on again. The hard disk may be damaged more seriously.

Moreover, an external hard disk is a very common technical product as well. However, to register the external hard disk with a handheld device (for example, a smart phone) is very complicated.

SUMMARY OF THE INVENTION

In order to solve the above-mentioned problems, an object of the present invention is to provide a smart data storage apparatus.

In order to solve the above-mentioned problems, another object of the present invention is to provide a data transmitting method for data storage apparatus.

In order to achieve the object of the present invention mentioned above, the smart data storage apparatus is applied to a handheld device. The smart data storage apparatus includes a dual interface memory unit, a data storage unit electrically connected to the dual interface memory unit, and an antenna unit electrically connected to the dual interface memory unit. The dual interface memory unit includes a communication bus interface subunit electrically connected to the data storage unit, a memory subunit electrically connected to the communication bus interface subunit, a radio frequency interface subunit electrically connected to the memory subunit and the antenna unit, a current-to-voltage converting subunit electrically connected to the radio frequency interface subunit, and a voltage regulating subunit electrically connected to the memory subunit and the current-to-voltage converting subunit. A wireless signal is sent from the handheld device to the antenna unit. The wireless signal is a radio frequency identification signal, or a near field communication signal. The wireless signal is induced to generate an induced current by the antenna unit. The induced current is sent from the antenna unit to the radio frequency interface subunit. The induced current is sent from the radio frequency interface subunit to the current-to-voltage converting subunit. The induced current is converted into an induced voltage by the current-to-voltage converting subunit. The induced voltage is sent from the current-to-voltage converting subunit to the voltage regulating subunit. The induced voltage is regulated into a driving voltage by the voltage regulating subunit. The driving voltage is sent from the voltage regulating subunit to the memory subunit to drive the memory subunit. A memory data is fetched from the memory subunit to the radio frequency interface subunit. The memory data is sent from the radio frequency interface subunit to the antenna unit. The memory data is sent from the antenna unit to the handheld device.

In order to achieve the other object of the present invention mentioned above, the data transmitting method for data storage apparatus is applied to a handheld device. The data transmitting method for data storage apparatus includes following steps. A wireless signal is sent from the handheld device to an antenna unit. The wireless signal is induced to generate an induced current by the antenna unit. The induced current is sent from the antenna unit to a radio frequency interface subunit. The induced current is sent from the radio frequency interface subunit to a current-to-voltage converting subunit. The induced current is converted into an induced voltage by the current-to-voltage converting subunit. The induced voltage is sent from the current-to-voltage converting subunit to a voltage regulating subunit. The induced voltage is regulated into a driving voltage by the voltage regulating subunit. The driving voltage is sent from the voltage regulating subunit to a memory subunit to drive the memory subunit. A memory data is fetched from the memory subunit to the radio frequency interface subunit. The memory data is sent from the radio frequency interface subunit to the antenna unit. The memory data is sent from the antenna unit to the handheld device. Moreover, the wireless signal is a radio frequency identification signal, or a near field communication signal.

DETAILED DESCRIPTION OF THE INVENTION

Figure 1:
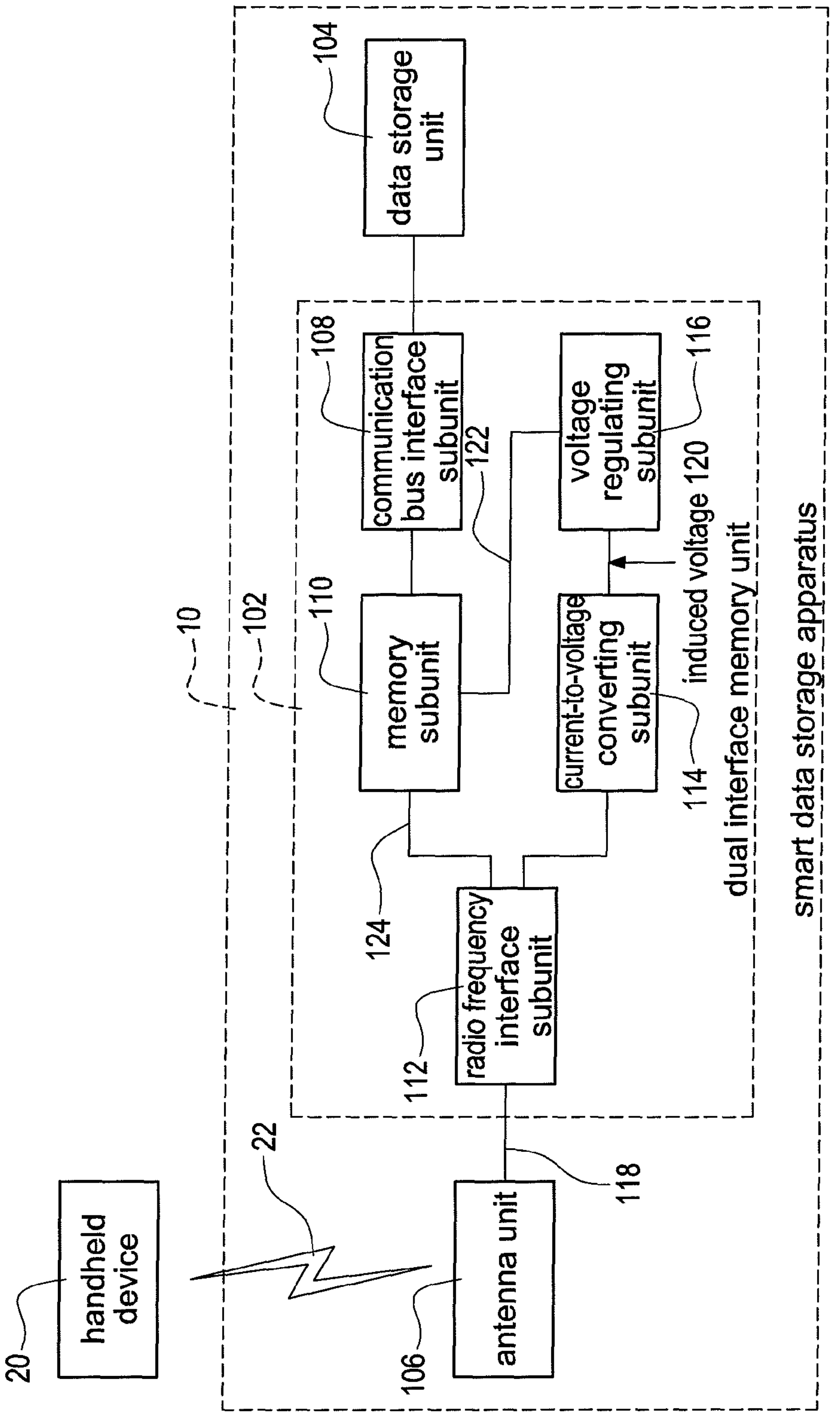
FIG. 1 shows a block diagram of the first embodiment of the smart data storage apparatus of the present invention.

FIG. 1 shows a block diagram of the first embodiment of the smart data storage apparatus of the present invention. A smart data storage apparatus 10 is applied to a handheld device 20. The smart data storage apparatus 10 includes a dual interface memory unit 102, a data storage unit 104, and an antenna unit 106.

The dual interface memory unit 102 includes a communication bus interface subunit 108, a memory subunit 110, a radio frequency interface subunit 112, a current-to-voltage converting subunit 114, and a voltage regulating subunit 116.

The memory subunit 110 is electrically connected to the communication bus interface subunit 108, the radio frequency interface subunit 112, and the voltage regulating subunit 116. The current-to-voltage converting subunit 114 is electrically connected to the radio frequency interface subunit 112, and the voltage regulating subunit 116. The antenna unit 106 is electrically connected to the radio frequency interface subunit 112. The data storage unit 104 is electrically connected to the communication bus interface subunit 108.

A wireless signal 22 is sent from the handheld device 20 to the antenna unit 106. The wireless signal 22 is, for example, a radio frequency identification signal (RFID signal), or a near field communication signal (NFC signal). The wireless signal 22 is induced to generate an induced current 118 by the antenna unit 106. The induced current 118 is sent from the antenna unit 106 to the radio frequency interface subunit 112.

The induced current 118 is sent from the radio frequency interface subunit 112 to the current-to-voltage converting subunit 114. The induced current 118 is converted into an induced voltage 120 by the current-to-voltage converting subunit 114. The induced voltage 120 is sent from the current-to-voltage converting subunit 114 to the voltage regulating subunit 116. The induced voltage 120 is regulated into a driving voltage 122 by the voltage regulating subunit 116.

The driving voltage 122 is sent from the voltage regulating subunit 116 to the memory subunit 110 to drive the memory subunit 110. A memory data 124 is fetched from the memory subunit 110 to the radio frequency interface subunit 112. The memory data 124 is sent from the radio frequency interface subunit 112 to the antenna unit 106. The memory data 124 is sent from the antenna unit 106 to the handheld device 20.

The radio frequency interface subunit 112 is, for example, a radio frequency identification interface (RFID interface), or a near field communication interface (NFC interface). The dual interface memory unit 102 is, for example, a dual interface electrically erasable programmable read only memory (dual interface EEPROM). The memory subunit 110 is, for example, an electrically erasable programmable read only memory (EEPROM). The communication bus interface subunit 108 is, for example, an inter integrated circuit bus ($I^2C$ bus).

The handheld device 20 is, for example, a personal digital assistant (PDA) or a smart phone. The radio frequency identification mentioned above could be high-frequency radio frequency identification (HF RFID), for example ISO15693, ISO14443A, ISO14443B, or could be low-frequency radio frequency identification (LF RFID), for example ISO11784, ISO11785. The near field communication mentioned above could be IS018092.

The data storage unit 104 is, for example, a hard disk. The information of the self-monitoring analysis and reporting technology of the data storage unit 104 is sent from the data storage unit 104 to the memory subunit 110 through the communication bus interface subunit 108. The memory data 124 (received by the handheld device 20 finally) is the information of the self-monitoring analysis and reporting technology of the data storage unit 104.

Therefore, the information of the self-monitoring analysis and reporting technology of the data storage unit 104 could be still received by the handheld device 20 when the data storage unit 104 has no power. For example, the data storage unit 104 might have second damage if the data storage unit 104 (which has already been damaged and damage condition thereof needs to be checked) is connected to power. The present invention could receive the information of the self-monitoring analysis and reporting technology of the data storage unit 104 without the power for the data storage unit 104.

Figure 2:
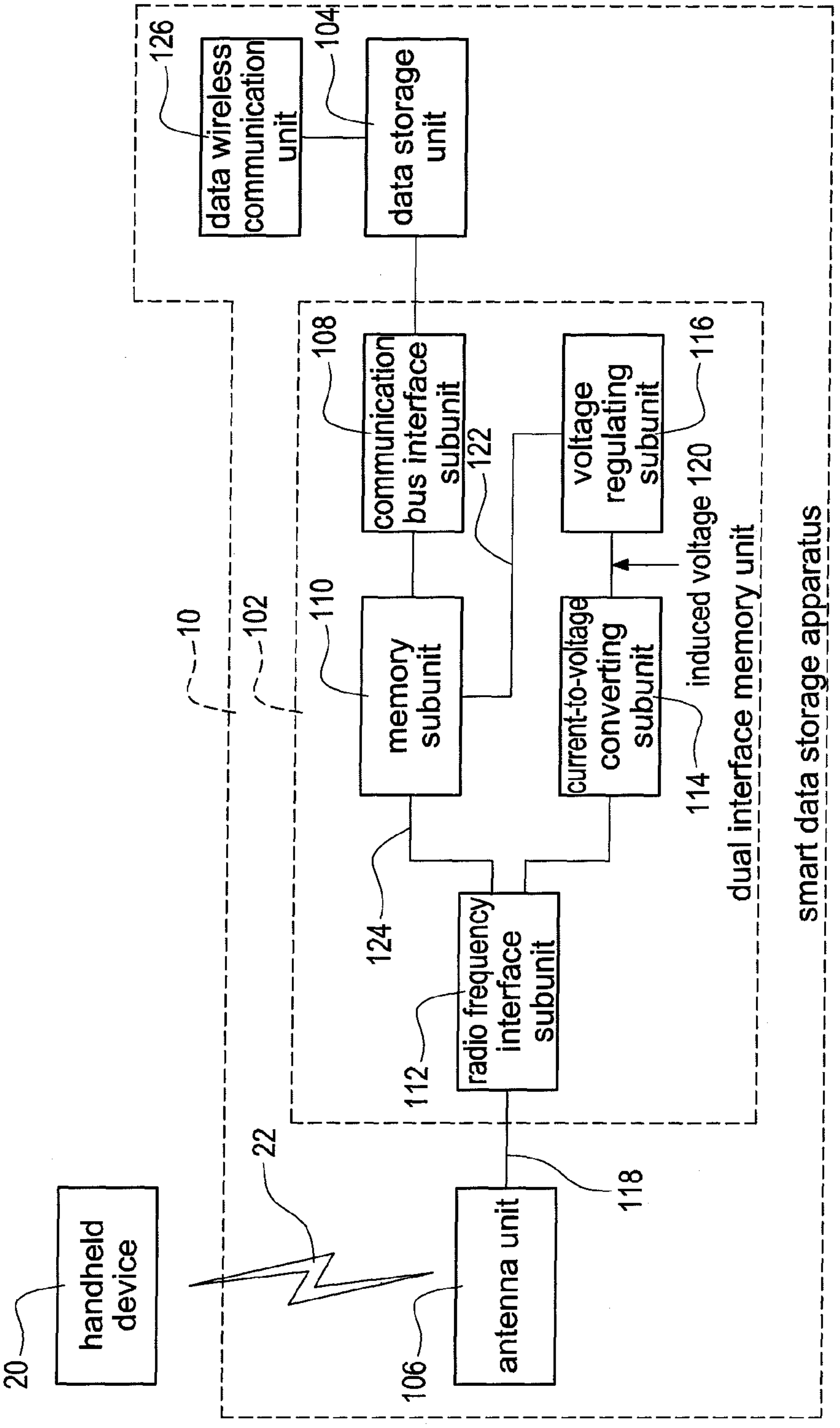
FIG. 2 shows a block diagram of the second embodiment of the smart data storage apparatus of the present invention.

FIG. 2 shows a block diagram of the second embodiment of the smart data storage apparatus of the present invention. The FIG. 2 is similar to the FIG. 1, so the description for similar parts in FIG. 2 would be omitted. The smart data storage apparatus 10 further includes a data wireless communication unit 126. The data wireless communication unit 126 is electrically connected to the data storage unit 104.

The data wireless communication unit 126 is used to wirelessly transmit the information stored in the data storage unit 104 to the handheld device 20. The data storage unit 104 is, for example, an external hard disk. The registration information of the data storage unit 104 is sent from the data storage unit 104 to the memory subunit 110 through the communication bus interface subunit 108. The memory data 124 (received by the handheld device 20 finally) is the registration information of the data storage unit 104. The data wireless communication unit 126 is, for example, a Bluetooth wireless communication circuit, or a Wi-Fi wireless communication circuit.

Therefore, the data storage unit 104 could be registered with the handheld device 20 quickly. Then, the information stored in the data storage unit 104 (a lot of information) could be transmitted wirelessly from the data wireless communication unit 126 to the handheld device 20.

Figure 3:
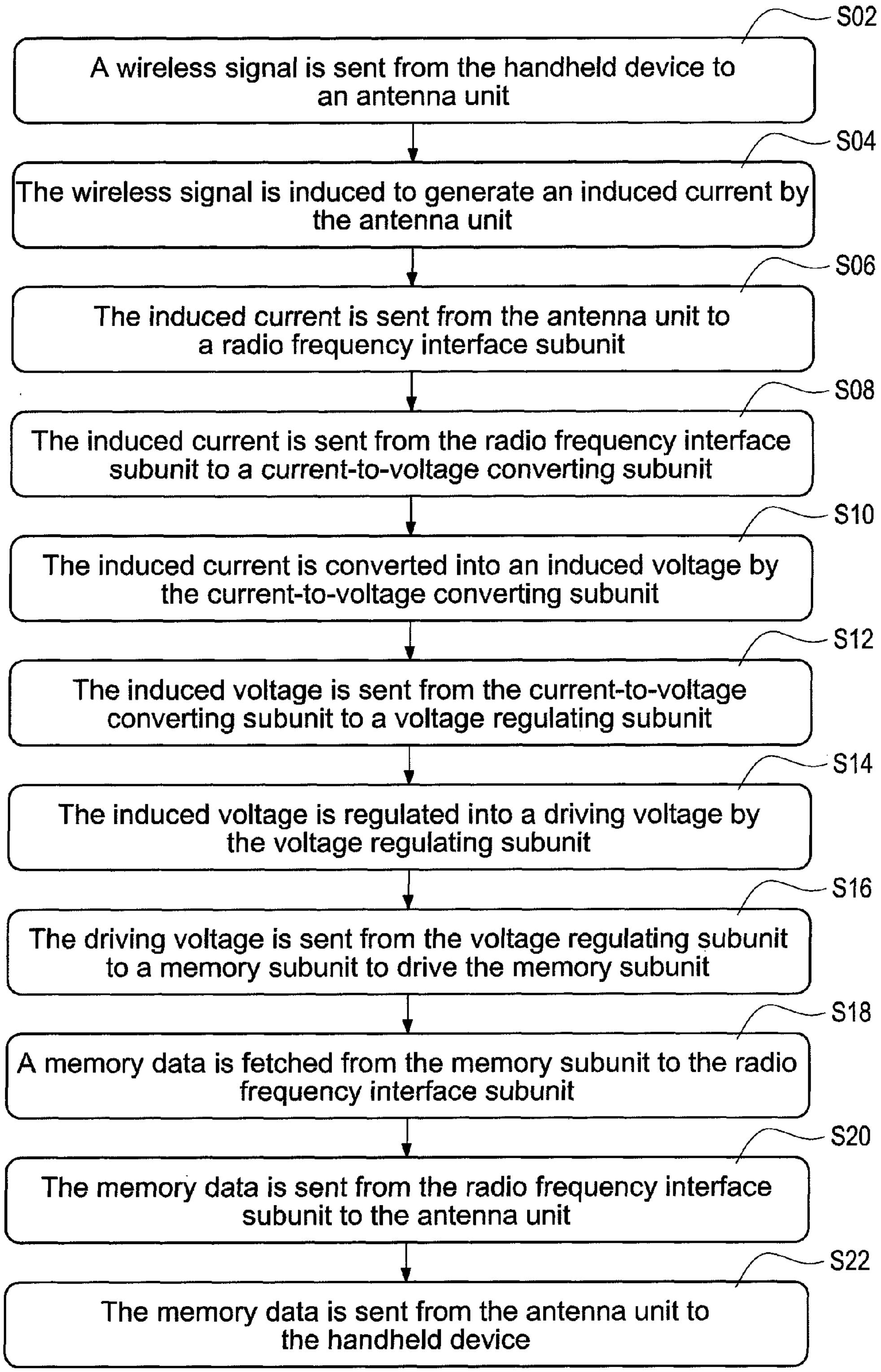
FIG. 3 shows a flow chart of the data transmitting method for data storage apparatus of the present invention.

FIG. 3 shows a flow chart of the data transmitting method for data storage apparatus of the present invention. The data transmitting method for data storage apparatus is applied to a handheld device. The data transmitting method for data storage apparatus includes following steps.

S02: A wireless signal is sent from the handheld device to an antenna unit.

S04: The wireless signal is induced to generate an induced current by the antenna unit.

S06: The induced current is sent from the antenna unit to a radio frequency interface subunit.

S08: The induced current is sent from the radio frequency interface subunit to a current-to-voltage converting subunit.

S10: The induced current is converted into an induced voltage by the current-to-voltage converting subunit.

S12: The induced voltage is sent from the current-to-voltage converting subunit to a voltage regulating subunit.

S14: The induced voltage is regulated into a driving voltage by the voltage regulating subunit.

S16: The driving voltage is sent from the voltage regulating subunit to a memory subunit to drive the memory subunit.

S18: A memory data is fetched from the memory subunit to the radio frequency interface subunit.

S20: The memory data is sent from the radio frequency interface subunit to the antenna unit.

S22: The memory data is sent from the antenna unit to the handheld device.

The wireless signal is, for example, a radio frequency identification signal, or a near field communication signal. The radio frequency interface subunit is, for example, a radio frequency identification interface, or a near field communication interface. The memory subunit is, for example, an electrically erasable programmable read only memory.

The handheld device is, for example, a personal digital assistant or a smart phone. The radio frequency identification mentioned above could be high-frequency radio frequency identification, for example ISO15693, ISO14443A, ISO14443B, or could be low-frequency radio frequency identification, for example ISO11784, ISO11785. The near field communication mentioned above could be ISO18092.

The data transmitting method for data storage apparatus of the present invention includes following two parts:

1. The information of the self-monitoring analysis and reporting technology of a data storage unit is sent from the data storage unit to the memory subunit through a communication bus interface subunit. The data storage unit is, for example, a hard disk. The memory data (received by the handheld device finally) is the information of the self-monitoring analysis and reporting technology of the data storage unit. The communication bus interface subunit is an inter integrated circuit bus.

Therefore, the information of the self-monitoring analysis and reporting technology of the data storage unit could be still received by the handheld device when the data storage unit has no power. For example, the data storage unit might have second damage if the data storage unit, which has already been damaged and need to check the damage condition thereof, is connected to power. The present invention could receive the information of the self-monitoring analysis and reporting technology of the data storage unit without the power for the data storage unit.

2. The registration information of a data storage unit is sent from the data storage unit to the memory subunit through a communication bus interface subunit. The data storage unit is, for example, an external hard disk. The memory data (received by the handheld device finally) is the registration information of the data storage unit. The communication bus interface subunit is an inter integrated circuit bus. The information stored in the data storage unit is wirelessly transmitted from a data wireless communication unit to the handheld device. The data wireless communication unit is, for example, a Bluetooth wireless communication circuit, or a Wi-Fi wireless communication circuit.

Therefore, the data storage unit could be registered with the handheld device quickly. Then, the information stored in the data storage unit (a lot of information) could be transmitted wirelessly from the data wireless communication unit to the handheld device.

The smart data storage apparatus and data transmitting method for the same of the present invention includes following two advantages.

1. The information of the self-monitoring analysis and reporting technology of the hard disk could be still received by the handheld device when the hard disk has no power, so that the hard disk will avoid the second damage.

2. The external hard disk could be registered with the handheld device quickly.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A smart data storage apparatus applied to a handheld device, the smart data storage apparatus including:

a dual interface memory unit;

a data storage unit electrically connected to the dual interface memory unit; and an antenna unit electrically connected to the dual interface memory unit, wherein the dual interface memory unit includes:

a communication bus interface subunit electrically connected to the data storage unit;

a memory subunit electrically connected to the communication bus interface subunit;

a radio frequency interface subunit electrically connected to the memory subunit and the antenna unit;

a current-to-voltage converting subunit electrically connected to the radio frequency interface subunit; and a voltage regulating subunit electrically connected to the memory subunit and the current-to-voltage converting subunit, wherein a wireless signal is sent from the handheld device to the antenna unit; the wireless signal is a radio frequency identification signal, or a near field communication signal; the wireless signal is induced to generate an induced current by the antenna unit; the induced current is sent from the antenna unit to the radio frequency interface subunit; the induced current is sent from the radio frequency interface subunit to the current-to-voltage converting subunit; the induced current is converted into an induced voltage by the current-to-voltage converting subunit; the induced voltage is sent from the current-to-voltage converting subunit to the voltage regulating subunit; the induced voltage is regulated into a driving voltage by the voltage regulating subunit; the driving voltage is sent from the voltage regulating subunit to the memory subunit to drive the memory subunit; a memory data is fetched from the memory subunit to the radio frequency interface subunit; the memory data is sent from the radio frequency interface subunit to the antenna unit; the memory data is sent from the antenna unit to the handheld device.

2. The smart data storage apparatus in claim 1, wherein the radio frequency interface subunit is a radio frequency identification interface, or a near field communication interface.

3. The smart data storage apparatus in claim 2, wherein the dual interface memory unit is a dual interface electrically erasable programmable read only memory; the memory subunit is an electrically erasable programmable read only memory; the communication bus interface subunit is an inter integrated circuit bus.

4. The smart data storage apparatus in claim 3, wherein the data storage unit is a hard disk; the information of the self-monitoring analysis and reporting technology of the data storage unit is sent from the data storage unit to the memory subunit through the communication bus interface subunit; the memory data is the information of the self-monitoring analysis and reporting technology of the data storage unit.

5. The smart data storage apparatus in claim 3, further including:

a data wireless communication unit electrically connected to the data storage unit, wherein the data wireless communication unit is used to wirelessly transmit the information stored in the data storage unit to the handheld device; the data storage unit is an external hard disk; the registration information of the data storage unit is sent from the data storage unit to the memory subunit through the communication bus interface subunit; the memory data is the registration information of the data storage unit.

6. The smart data storage apparatus in claim 5, wherein the data wireless communication unit is a Bluetooth wireless communication circuit, or a Wi-Fi wireless communication circuit.

7. A data transmitting method for data storage apparatus applied to a handheld device, the data transmitting method for data storage apparatus including:

a. sending a wireless signal from the handheld device to an antenna unit;

b. inducing the wireless signal to generate an induced current by the antenna unit;

c. sending the induced current from the antenna unit to a radio frequency interface subunit;

d. sending the induced current from the radio frequency interface subunit to a current-to-voltage converting subunit;

e. converting the induced current into an induced voltage by the current-to-voltage converting subunit;

f. sending the induced voltage from the current-to-voltage converting subunit to a voltage regulating subunit;

g. regulating the induced voltage into a driving voltage by the voltage regulating subunit;

h. sending the driving voltage from the voltage regulating subunit to a memory subunit to drive the memory subunit;

i. fetching a memory data from the memory subunit to the radio frequency interface subunit;

j. sending the memory data from the radio frequency interface subunit to the antenna unit; and k. sending the memory data from the antenna unit to the handheld device, wherein the wireless signal is a radio frequency identification signal, or a near field communication signal.

8. The data transmitting method for data storage apparatus in claim 7, wherein the radio frequency interface subunit is a radio frequency identification interface, or a near field communication interface; the memory subunit is an electrically erasable programmable read only memory.

9. The data transmitting method for data storage apparatus in claim 8, further including:

l. sending the information of the self-monitoring analysis and reporting technology of a data storage unit from the data storage unit to the memory subunit through the communication bus interface subunit, wherein the data storage unit is a hard disk; the memory data is the information of the self-monitoring analysis and reporting technology of the data storage unit; the communication bus interface subunit is an inter integrated circuit bus.

10. The data transmitting method for data storage apparatus in claim 8, further including:

m. sending the registration information of a data storage unit from the data storage unit to the memory subunit through the communication bus interface subunit; and n. transmitting the information stored in the data storage unit wirelessly from a data wireless communication unit to the handheld device, wherein the data storage unit is an external hard disk; the memory data is the registration information of the data storage unit; the communication bus interface subunit is an inter integrated circuit bus; the radio frequency interface subunit is a radio frequency identification interface, or a near field communication interface.

* * * * *